United States Patent
Davis

[15] 3,660,887
[45] May 9, 1972

[54] METHOD FOR CONNECTING ATTACHMENTS TO FIBER GLASS RODS

[72] Inventor: Elbert Davis, Los Angeles, Calif.
[73] Assignee: Nupla Corporation, Sun Valley, Calif.
[22] Filed: June 20, 1969
[21] Appl. No.: 835,135

[52] U.S. Cl. ............................29/460, 29/527.1, 24/122.6, 264/262, 287/124
[51] Int. Cl. .....................................B23p 3/00, B23p 19/04
[58] Field of Search....................287/124; 24/122.6; 29/460, 29/527.1; 264/262

[56] References Cited

UNITED STATES PATENTS

| 1,577,003 | 3/1926 | Sunderland | 24/122.6 X |
| 2,869,214 | 1/1959 | Van Buren | 29/460 UX |
| 3,100,924 | 8/1963 | Trier et al. | 24/122.6 |
| 3,226,805 | 1/1966 | Scott et al. | 287/124 X |

FOREIGN PATENTS OR APPLICATIONS 346,846   7/1960   Switzerland.........................287/124

*Primary Examiner*—Charlie T. Moon
*Attorney*—Robert C. Comstock

[57] ABSTRACT

A method for connecting an attachment to the end of a fiber glass rod, tube or other elongated member. The rod is separated into a plurality of segments which are held apart from each other by a spacer-spreader to form an enlargement at the end of the rod. A plug is disposed within the interior of the separated segments, preferably being cast in place. A socket is formed around the exterior of the segments, also preferably being cast in place within a fitting disposed around the enlargement. A relatively thin barrier film of friction reducing material is applied to the exterior of the enlargement, forming a slip plane between the enlargement and the socket, so that upon the application of longitudinal tension to the rod all of its strands and the plug will simultaneously move longitudinally with the socket to convert such tension into lateral compression which transfers the load across the entire cross-section of the rod.

9 Claims, 13 Drawing Figures

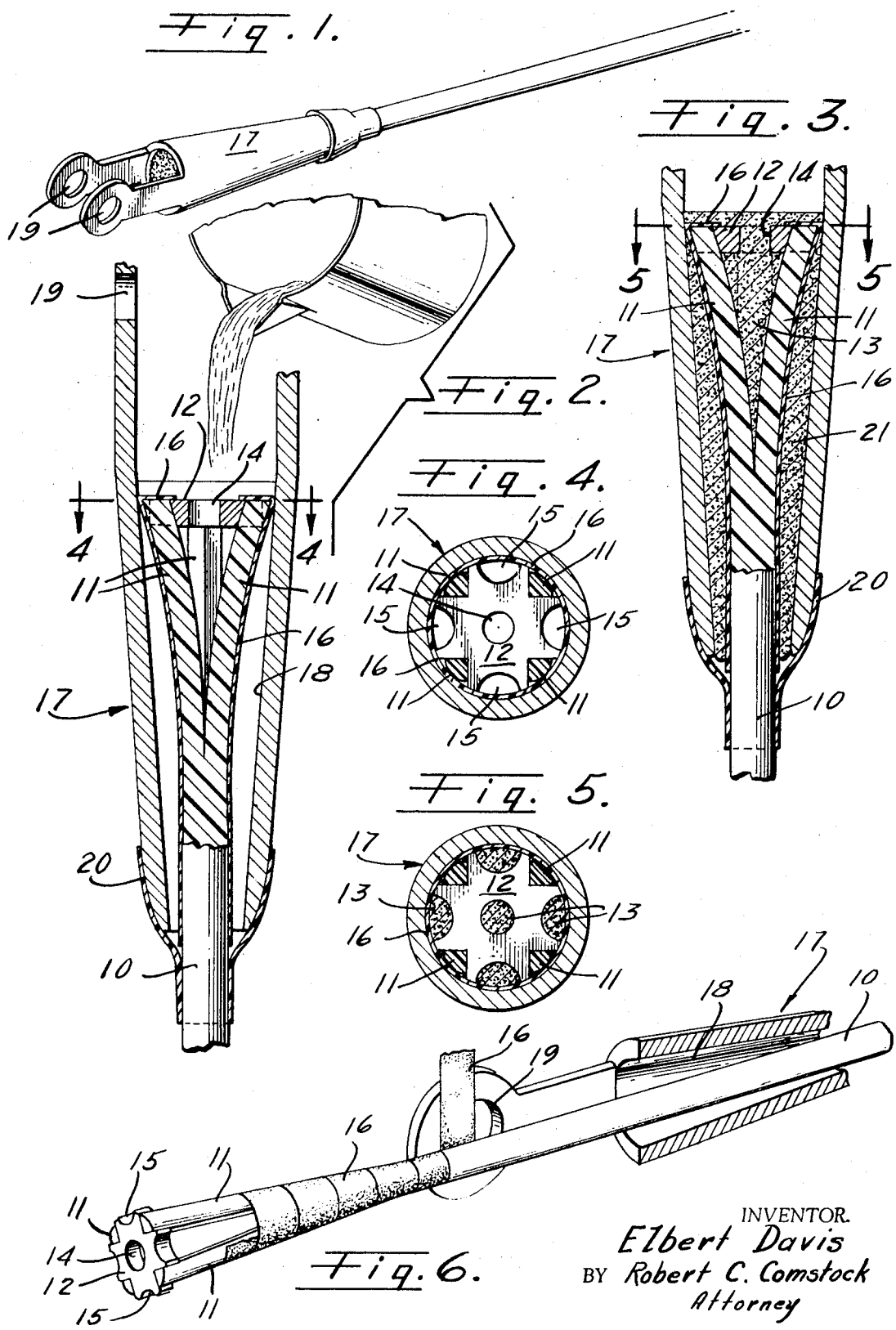

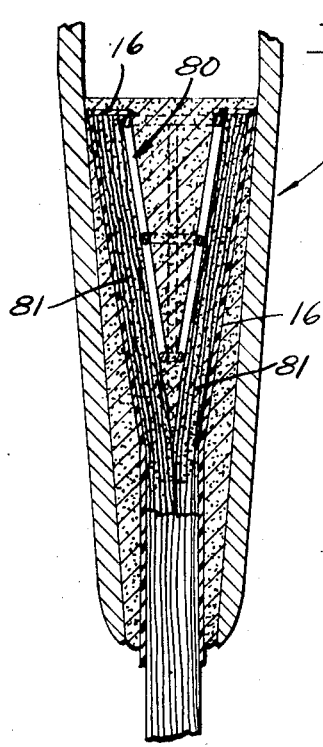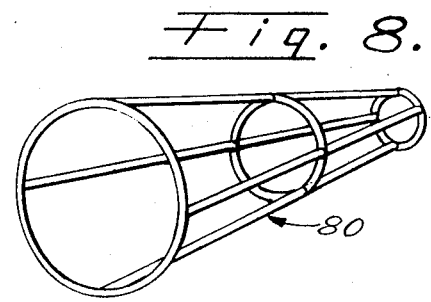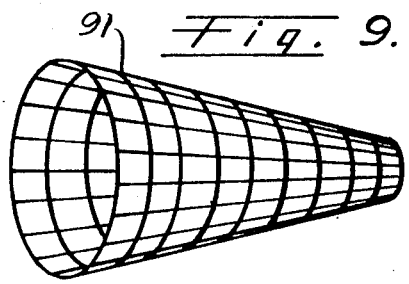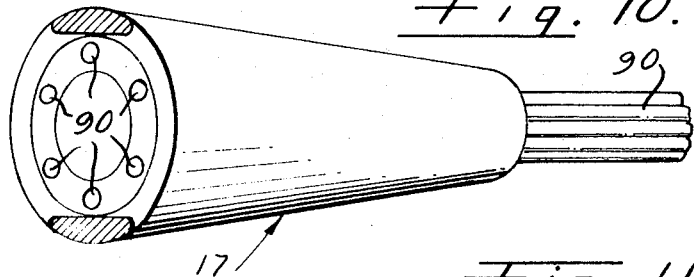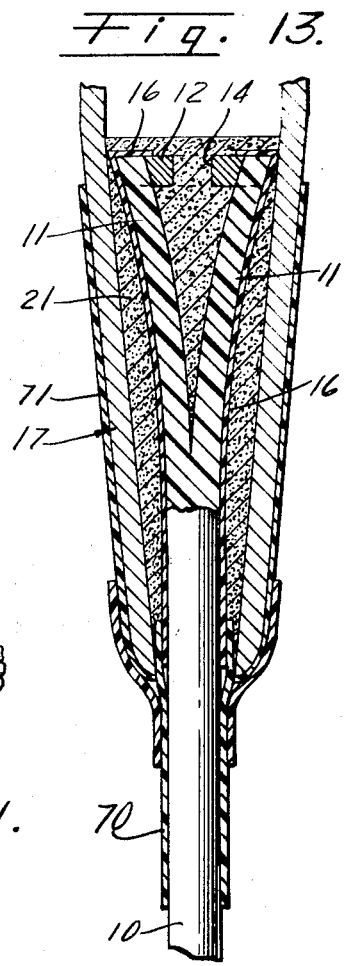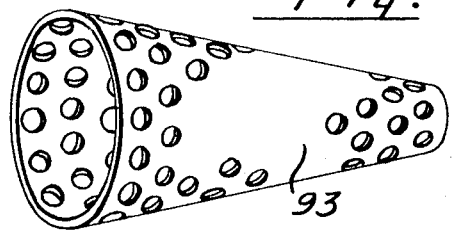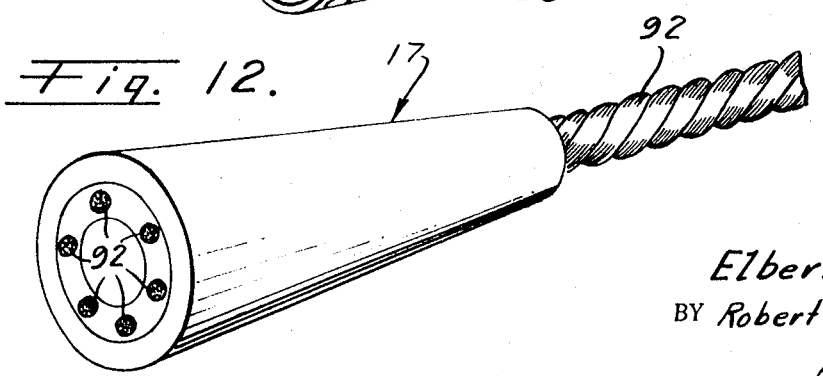

METHOD FOR CONNECTING ATTACHMENTS TO FIBER GLASS RODS

BACKGROUND OF THE INVENTION

1. Field of the Invention

The invention relates to a method for connecting attachments to the ends of fiber glass rods, tubes and other elongated members.

2. Description of the Prior Art

Fiber glass rods and similar shapes possess great strength, but methods used heretofore to attach end fittings to them have not been entirely satisfactory. No practical end fitting has been available which could successfully transfer loads evenly from the end attachments, such as clevises, eye bolts, hooks, pins or other attachment members, to the fiber glass rod.

When such connecting members are attached to metal rods, there is sufficient cohesion in the material itself so that a load which is applied to the surface is distributed uniformly throughout the entire cross-section of the rod. In a rod formed of fiber glass, however, rod comprises a large number of individual glass fiber reinforcing members which are held together by a resin binder. The resin binder forms bridges between the fibers, which bridges are comparatively weak and cannot effectively transmit a load from one reinforcing member to another. It is accordingly far more difficult to transmit a load through the adhesive or binder of a fiber glass rod than through the cohesive mass of a metal or other integral rod.

Numerous devices and methods have been devised for connecting attachments to the ends of fiber glass rods. All such efforts have been unsatisfactory to a greater or lesser degree for various reasons. In many cases, the fibers are degraded and weakened by being bent, abraded, or otherwise damaged, so that they are no longer capable of carrying their full potential load.

It has been known for years that fairly satisfactory loading of fiber glass rods may be accomplished by enlarging the ends of the rod by splitting it into segments, inserting a tapered wedge and then holding these enlarged ends in a metal end attachment having a smoothly tapered frusto-conical interior portion.

However, there are several disadvanges in using this approach. When the total included angle of the interior portion of the end attachment is less than 4° or 5° there is a tendency for the enlarged rod to slip out of the end fitting or, because of the extreme mechanical advantage involved, to split the end fitting and thus fail to carry the load. When the total included angle is greater than about 20°, the glass fibers in the divided segments are likely to fracture because of excessive flexural stress.

Also, any imperfection in the fit between the enlarged rod end and the tapered interior of the end fitting will result in stress concentration, consequent fiber breakage, and therefore premature failure to carry the applied load.

Even more important than the foregoing causes of failure is the failure which results simply because the segments slip and pull out of the tapered end fitting without breaking. This type of failure occurs when the tensile forces exceed the shear strength of the resin to fiber bond. If the compressive forces resulting from the wedge action are not sufficient to overcome these shear forces, the segments are allowed to slip out of the end fitting and the fitting fails. Similarly, a failure can occur when one or more segments slip, thereby placing all of the load on the remaining segments. Naturally, maximum breaking strength can not be realized when only a portion of the rods' fibers are sharing the load.

End fittings which are merely clamped on to the rod have the obvious advantage of not splitting or bending the rod and thus preserving its integrity, but the length of fitting required to provide the necessary gripping area is so excessive as to make such an approach a practical impossibility and aconomically unreasonable.

When multi-jawed chuck type fittings are used, the rod is crushed before full strength is realized. In the case of resin potted tapered fittings, using a split rod and a tapered wedge, localized stress concentration results where the wedge causes the glass fibers to change direction, thereby throwing abnormally high loads on the fibers at this bend. In the case of spirally wrapped wire conforming "preform grips," which are intended to tighten as the load increases, the glass fibers along the surface of the rod are broken as the wire tightens and cuts into the surface, and failure is initiated prematurely.

SUMMARY OF THE INVENTION

It is the primary object of this invention to provide a method for connecting attachments to fiber glass rods so that the strength of such connections is equal to the full strength of the rod. Heretofore, end fittings used on fiberglass rods have been unsatisfactory in that the ultimate potential strength of the rods has not been effectively utilized.

In principle, maximum breaking strength may be realized in a glass fiber reinforced rod only when all the fibers are placed in tension simultaneously so as to distribute the load effectively throughout the entire cross-section of the rod. Under such an ideal condition, all the fibers are stressed equally in tension to their ultimate load carrying capacity and finally fail as a unit, resulting in the maximum possible breaking strength.

It is an object of the present invention to minimize damage to any of the glass fibers comprising the rod and to transfer the entire tensile load from the end attachment through the fitting to the surface of the rod and from this surface by compression to all of the fibers within the rod so that final failure occurs in the body of the rod rather than in or at the end fittings, thus realizing the maximum possible breaking strength. This desirable result may be accomplished only by developing progressively increasing compressive force on virtually all of the rods' fibers simultaneously inside the fitting as the tensile load is applied and this must be accomplished without applying damaging shear or bending stresses to the glass composite.

The present invention contemplates splitting the end of the rod into a plurality of segments. A spacer-spreader member is preferably used to hold the segments apart in the desired pattern.

The most desirable structure is believed to be one in which the tapered interior portion of an end socket is perfectly and precisely matched to the outer contour of the enlarged end of the rod. This is achieved in the present invention by placing a fitting around the enlarged end of the rod and then filling the space between the outer periphery of the rod and the inner wall of the end fitting with a suitable resin binder or potting compound. This results in the formation in situ of a perfectly conforming socket which adheres tightly to the fitting and for practical purposes becomes a part thereof.

The area between the split rod segments is also filled in the same manner, either separately or simultaneously with the filling of the area between the rod and fitting. The in situ filling of the inner area between the spread-apart segments provides a perfectly matched cast wedge between the segments. The filling which surrounds the outside of the segments provides a perfectly matched socket which surrounds the segments and which is disposed between them and the inner wall of the fitting.

A barrier film or lubricant which is non-adhering with respect to the potting compound is preferably provided between the outer periphery of the split segments and the outer cast-in-place socket. The barrier film serves the extremely important function of preventing adhesion between the potting resin and the outer surface of the rod. Also, the barrier film allows the potting resin on the inside and the outside of the barrier to form two perfectly conforming but separate tapered castings. As a result of this separation and the specific lack of adhesion in the area of the rods' outer surface, the rod with its enlarged tapered end is relatively free to move as a unit as the tensile load is applied. This movement is counteracted by the automatic development of gradually increasing compressive forces as the tapered rod moves in the conforming tapered socket surrounding the barrier film.

No stress is exerted by such a liquid casting on the glass fibers until the rod assembly is loaded in tension and the enlarged tapered end of the rod moves in its conforming socket, such movement resulting in the development of progressively increasing compressive forces on the segments within the socket. The loading is thus transferred from the fitting in such a manner that, due to these compressive forces, the load is carried substantially equally by all of the rod fibers.

An important advantage achieved by the invention is that any variations or manufacturing tolerances in rod diameter, roundness, accuracy of splitting, size and taper of end fitting, etc., all of which were extremely critical in previous methods and structures, may now be substantially ignored. This results from the fact that the plug and socket are both individually tailored to conform to the particular configurations involved.

It is accordingly an object of the invention to provide a method for connecting attachments to the ends of fiber glass rods and the like having all of the advantages and benefits set forth above and described hereafter in further detail in this specification.

The invention also comprises such other objects, advantages and capabilities as will later more fully appear and which are inherently possessed by the invention.

While there are shown in the drawings preferred embodiments of the invention, it should be understood that the same are susceptible of modification and change without departing from the spirit of the invention.

DESCRIPTION OF THE DRAWINGS

FIG. 1 is a perspective view of a fiber glass rod with an end fitting attachment mounted on one end thereof;

FIG. 2 is an enlarged longitudinal view of the rod and attachment, showing the potting compound being poured into the end of the attachment to form the cast-in-place plug and socket;

FIG. 3 is a view similar to FIG. 2 after the potting compound has been poured;

FIG. 4 is a sectional view taken on line 4—4 of FIG. 2;

FIG. 5 is a sectional view taken on line 5—5 of FIG. 3;

FIG. 6 is an exploded perspective view of the attachment assembly, showing the rod segments spread apart around the spacer-spreader, with part of the barrier film tape wound around the expanded segments;

FIG. 7 is a longitudinal sectional view of an alternative embodiment of the invention in which a wire grid is used to hold apart a plurality of fiber strands;

FIG. 8 is a perspective view of the wire grid used in FIG. 7;

FIG. 9 is a perspective view of an alternative wire screen spacer-spreader which may be used to separate strands or rods;

FIG. 10 is a perspective view showing an attachment mounted on the end of a plurality of straight rods;

FIG. 11 is a perspective view of an alternative perforated conical spacer-spreader;

FIG. 12 is a perspective view showing an attachment mounted on the end of a plurality of twisted rope-like strands;

FIG. 13 is a perspective view of an alternative embodiment similar to FIGS. 1–6 in which arc-resistant material has been added to overcome arc-tracking.

DESCRIPTION OF THE PREFERRED EMBODIMENT

A preferred embodiment which has been selected to illustrate the invention comprises an elongated fiber glass rod 10 having a circular cross-sectional configuration. The end of the rod to which attachment is to be made is split into four equal segments 11. This splitting may be achieved in any desired manner, such as by driving a tapered tool inwardly from the free end of the rod 10. It is desirable that the split segments of the rod be approximately equal in cross-section.

The segments 11 of the fiber glass rod 10 are spread in a smooth gentle curve by means of a spacer-spreader 12. None of the fibers of the rod 10 are contacted and thereby stressed to the point of incipient fracture by a wedge driven inside the segments. The curve taken by the segments should be a natural one determined by the fibers themselves and the cross-sectional area of the segments. The fibers thus assume a position of minimum residual stress and their position is not determined by a wedge or by the enclosing walls.

The spacer-spreader 12 may be formed of any suitable material, such as metal, molded plastic or a pre-cast part made from the same composition as the potting compound. It is desirable that the spacer-spreader 12 be tapered to conform approximately to the predicted angle of the segments, in order to minimize stress concentration.

The open areas between the segments 11 are then filled with a cast-in-place substantially wedge-shaped plug 13, which is preferably formed by pouring a suitable potting compound which is fluid enough to fill all voids into the end of the rod through and/or around the spacer-spreader 12.

The configuration of the spacer-spreader is subject to many variations. In the embodiment in FIGS. 2–6 of the drawings, a center opening 14 is provided to facilitate pouring the liquid potting material between the segments 11. Additional holes, surface grooves or other reliefs may be incorporated in the spacer-spreader 12 to facilitate pouring of the potting compound and to release air bubbles during the casting operation. In the embodiment shown in the drawings, the spacer-spreader 12 has spaced peripheral openings 15 which serve these purposes.

The spacer-spreader 12 preferably covers only a relatively small proportion of the area created on the inside of the rod 10 by the splitting of the segments 11. This is in contrast to the conventional use of an inserted wedge which covers nearly all of this area. The large area left available by the spacer-spreader 12 allows more contact area for potting resin to flow in and bound to the inner surfaces of the split segments. This results in the formation in situ of a perfectly conforming and tightly adhering inner plug 13.

The potting material may be any fluid which can be poured in place and which will harden with minimum shrinkage to a solid with good tensile strength, impact strength, and compressive strength. For example, a bisphenol A-type epoxy resin with 10 percent diethylene triamine or triethylene tetramine catalyst and 20 to 30 percent aluminum powder, glass micro spheres, or ground silica as a filler provides a practical potting resin with excellent compressive strength.

Before the potting compound is poured through the spacer-spreader 12 into the area between the end segments 11, the segments are preferably first provided with an outer barrier film 16. The barrier film 16 may comprise any suitable material which is substantially non-adhesive with respect to the potting compound and which will accordingly form a slip plane which surrounds the end segment assembly. For example, polyethylene, polyurethane, Mylar polyester film, polyvinylidene chloride, rubber, silicone rubber, fluorinated ethylene propylene, and polytetrafluoroethylene may be used.

A preferred embodiment of the invention uses Teflon polytetrafluoroethylene tape wrapped around the split rod segments 11 to form the barrier film 16. The tapered end is spirally wrapped, starting at the enlarged end, with unsintered Teflon tape one-half inch wide by 4 mils thick. By overlapping the tape, an effective seal is provided so that a true barrier is formed between the displacement plug zone and the outer socket zone of potting resin. The tape wrapping is continued down the rod to a point which will be outside the fitting, so that no potting resin will contact the outer surface of the rod and cause later damage to fibers during loading. The tape preferably extends over the free end of the rod segments 11.

After the barrier film 16 has been applied around the outside of the segments 11, the tape wrapped rod end is placed within an end fitting 17 having a frusto-conical tapered inner wall 18 of somewhat larger diameter than that of the expanded segments 11. The end fitting 17 may be made from any suitable high tensile structural material such as metal. The inner wall 18 of the end fitting 17 should preferably, for convenience and economy, conform approximately to the taper of the end segment assembly with the spacer spreader 12 in place. Aligned openings 19 may be provided in the outer end of the end fitting 17 for the purpose of attaching a pin, yoke and bail assembly or other fastening means to the end fitting 17.

An elastomeric plastic seal 20 formed of material such as polyvinylidene chloride, polyurethane or silicone rubber may be used to enclose the inner end of the fitting 17 and overlap onto the rod 10. The seal 20 prevents leakage of the potting resin during assembly and provides additional weather protection and electrical insulation to the rod 10. The seal 20 preferably comprises a tube or sleeve formed of resilient or heat shrinkable material, but any material which will dam the potting material can be used.

After slipping the resilient seal 20 into position, the potting resin may be poured separately or simultaneously into the two chambers formed by the Teflon tape barrier. If absolute and complete separation is desired between the two castings, the potting resin is not filled beyond the end of the tape. However, to effect a perfect seal at the outer open end of the fitting 17, the potting resin may be poured so as to fill beyond the tape and join the two castings in this area only. In this latter case a separation will occur in this area during the first exposure to substantial tensile load, but the assembly will remain effectively sealed by the potting resin. After this minor separation, the two separate potted sections are free to move just as if they had been cast separately.

To facilitate the smooth movement and smooth transferal of load from fitting 17 to rod 10, a lubricant may be used on either or both surfaces of the barrier film 16 and/or on the inner wall 18 of the fitting 17. Such lubricant may be applied conveniently from an aerosol spray of Teflon, molybdenum disulfide, or silicone compound.

The potting operation may also be carried out in two separate steps. In the first step, the displacement plug 13 may be cast in place while outside the fitting. In this case, the barrier film 16 may serve as a mold for retaining the liquid potting resin or an actual mold may be used. If a mold is used, the barrier film 16 becomes unnecessary and the mold shape may assume any convenient taper, not necessarily precluding the extension of the displacement plug 13 beyond the outer surface of the split segments 11, and only a lubricant or release agent need be applied to the exterior of the casting thus formed. Such lubricant serves the same purpose as the barrier film and provides a slip plane at the interface between the tapered casting and the potted conforming cavity which is to be formed subsequently.

As a second step, the lubricated enlarged tapered rod end is positioned within the fitting 17 and a second potting operation produces a perfectly conforming tapered socket 21 to fit the enlarged rod and also to fit the inner wall 18 of the end fitting 17. All spaces within the segments 11 and within the end fitting 17 are thus filled and all fibers are supported without concentrated stress areas.

With either method or structure, a slip plane is provided along a predicted rather than a random plane, whereby none of the fibers in the rod are abraded or unevenly stressed. The outer cast portion 21 forms a perfectly matched socket which is complementary to the outer periphery of the end segment assembly and which is separated therefrom by a slip plane formed by the barrier film 16.

The present invention is particularly adapted for use in fiber glass rods which are used as guy strain insulators and antenna guy rods and other structural tensioning devices for use in high voltage and high frequency environments. In such environments and in transmission lines and other installations where lightning strikes are a possibility, great care must be taken to avoid exposure of fiber glass composite rods to the effects of high voltage arcing and tracking. The normal bonding resins used in such rods leave a conductive carbon track after repeated arcing from high voltage flashovers and may even burn through until the entire rod fails.

FIG. 13 of the drawings shows a high voltage strain insulator which overcomes the arc-tracking problems associated with previous designs. The structure and method of assembly are the same as shown and described with reference to FIGS. 1–6 of the drawings, but both the rod and end fitting have been covered with a high dielectric arc resistant material to resist the deleterious tracking described above.

The outer end of the rod is provided with a coating 70 which may be an arc resistant silicone rubber applied as a liquid dispersion or solution and cured by heating, or shrink tubing capable of being slipped on the rod and shrunk tight by heating, or ceramic tubing bonded into place with epoxy resin, or other suitable material. The coating 70 preferably extends into the fitting.

The outside of the fitting is provided with a coating 71, which may be silicone rubber applied in liquid form and baked, shrink tubing, or a ceramic finish applied by dipping or spraying, followed by baking, or other suitable material.

It is also possible to use either one of the coatings 70 and 71 without using the other.

The method of the invention may be applied to any profile shape which is capable of being split, splayed, separated, unravelled, untwisted or otherwise modified at its ends to form an enlarged tapered portion.

Such a tapered portion need only be held or spread in such enlarged tapered configuration long enough (1) to apply to its outer surface a barrier film having a low coefficient of friction, (2) to cast in the interior of such tapered portion a perfectly conforming tapered displacement plug shaped structure and (3) to cast on the exterior of such barrier film a perfectly conforming socket which fits the exterior surface of the enlarged tapered portion of the profile shape and at the same time fits the interior tapered portion of an appropriate retaining shell or fitting attachment.

Solid fiber glass composite rods with oval or rectangular cross-section may be treated as round rods. That is, the split segments may be spread so as to graduate smoothly from the rods' specific cross-section to a circular configuration at the outer opening of the end fitting. The fitting may follow the same general shape or may have a smoothly tapered frusto-conical interior, with the excess space being filled by the cast potting resin. Similarly, a tubular composite may be enlarged at its end to form a smoothly tapered configuration.

A rod need not necessarily be a solid bonded composite, this invention makes possible the application of a single common end fitting to a plurality of rods or strands. For example, a number of small diameter rods, which provide the strength of a single large diameter rod, but also offer the advantage of flexibility and coilability, may be spread and/or split at their ends and potted in accordance with the invention (with suitable spreaders) as if the separate segments were all part of a larger single rod.

As another example, a large number of separate flexible strands such as rubber bonded fiberglass tire cord may be treated as a unit whether the separate strands are bounded into a composite or not. To practice the present invention, the strands are treated the same as split segments of a rod or strands of a rope and potted in a tapered configuration with a lubricating barrier and a conforming potted supporting cavity.

FIG. 7 of the drawings shows an alternative embodiment of the invention in which a plurality of individual strands 81 are spaced apart by a wire grid spacer-spreader 80 of the type shown in FIG. 8.

FIG. 10 shows a plurality of straight rods or strands 90 which are held apart by a wire screen spacer-spreader 91 of the type shown in FIG. 9.

FIG. 12 shows a plurality of twisted rope-like strands 92 which are held around a perforated conical spacer-spreader 93 of the type shown in FIG. 11.

These are cited merely as examples showing various ways in which the invention can be practiced.

As long as the principles of this invention are followed, end fittings may be constructed for any profile shape which can be separated at its ends into a plurality of segments, bundles, strands, fibers, or other element of the composite profile. All that is required is that the appropriate regions be spread, potted, tapered, lubricated and retained in tapered mating cavities as described.

Such a rope or profile shape is separated at its ends by splitting, untwisting, or by other physical or chemical means into a plurality of elements. These elements are spread into a tapered configuration by any convenient means such as positioning them over a supporting grid or screen or by holding them temporarily on the interior surface of a tapered cavity for an intermediate potting step.

Such tapered structure is then lubricated or wrapped with a barrier film having a low coefficient of friction and potted within a retaining shell so as to produce simultaneously a tapered wedge shaped casting within the barrier and a tapered socket casting outside the barrier conforming perfectly both to the wedge shaped casting and to the retaining shell.

I claim:

1. A method of connecting an attachment to the end of a solid elongated member having a multiplicity of non-metallic strands, which includes placing around the end of said member a fitting, spreading the end of said member to form an outwardly tapering enlargement, providing means to hold said end in spread condition, applying to the exterior of said enlargement a relatively thin barrier film of friction reducing material, moving said fitting into a position surrounding said enlargement, and casting in place within said fitting a socket of potting compound or the like, said socket having an inwardly tapering interior formed complementarily to the exterior of said enlargement, said barrier film forming a slip plane between the exterior of said enlargement and the complementary interior of said socket, whereby upon the application of longitudinal tension to said elongated member, said enlargement and all of the strands of said member are adapted to move simultaneously as a unit within said socket and along said slip plane to increase the lateral compression on all of said strands simultaneously and thereby convert said longitudinal tension into lateral compression which transfers the load across the entire cross-section of the portion of said elongated member disposed within said socket.

2. The method described in claim 1, and forming said barrier film by applying polytetrafluoroethylene material around the outside of said enlargement.

3. The method described in claim 1, and forming said barrier film by winding polytetrafluoroethylene tape around the outside of said enlargement.

4. The method described in claim 1, and dividing the end of said elongated member into a plurality of segments, spreading said segments apart from each other, and casting a plug of potting compound or the like in place within said end, said plug substantially filling all of the space between said segments.

5. The method described in claim 4, and casting said socket and plug in place simultaneously.

6. The method described in claim 4, and forming said barrier film by winding polytetrafluoroethylene tape around the outside of said enlargement, and casting said plug in place within the mold formed by said tape.

7. The method described in claim 4, and forming said potting compound of epoxy resin with a catalyst and powdered reinforcing filler for compressive strength.

8. The method described in claim 7, and forming said barrier film of polytetrafluoroethylene tape wound around the the outside of said enlargement.

9. The method described in claim 8, and mounting a tubular resilient seal on the inner end of said fitting, said seal extending over the adjacent portion of said elongated member.

* * * * *